March 24, 1925.  1,530,654
F. A. DALEY
AGITATOR, CUTTER, AND FEEDER
Original Filed Jan. 2, 1923
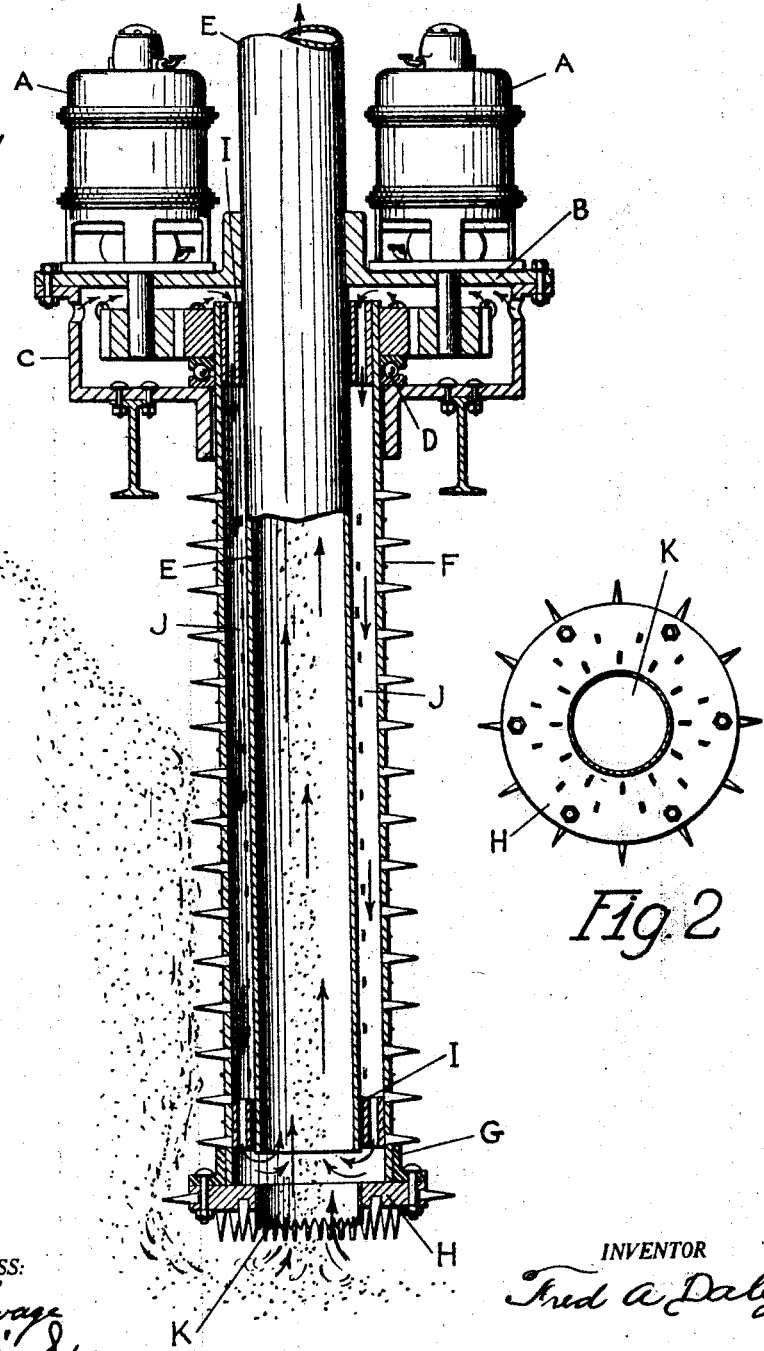
WITNESS:
INVENTOR
Fred A Daley Patented Mar. 24, 1925.

1,530,654

UNITED STATES PATENT OFFICE.

FRED A. DALEY, OF PORTLAND, OREGON.

AGITATOR, CUTTER, AND FEEDER.

Application filed January 2, 1923, Serial No. 610,380. Renewed January 5, 1925.

*To all whom it may concern:*

Be it known that I, FRED A. DALEY, a citizen of the United States, residing at Portland, in the county of Multnomah and the State of Oregon, have invented certain new and useful Improvements in an Agitator, Cutter, and Feeder, of which the following is a specification.

My invention relates to apparatus for agitating, cutting and feeding pieces of boards sticks or bark, together with hog or cut fuel, or waste from a lumber mill, storage bin or pile; into the vacuum or suction end of a pneumatic conveying system.

This apparatus is a means for cutting wood into pieces small enough to enter the pipe line without clogging, for cutting and loosening fine material so it will feed automatically by force of gravity to the end of the pipe line, thence into the pipe line by the force of a vacuum. It can be supported and handled by any convenient method such as a crane derrick or truck, it can be operated in any direction and to any depth, cutting loosening and feeding the material automatically into the vacuum end of a pneumatic conveying system.

The object of my invention is to provide a substantial mechanical means for cutting loosening and feeding the said material, and convey it with a pneumatic tube system instead of mechanical conveyors.

I attain these objects with the apparatus as shown in the accompanying drawing, in which:

(Fig. 1) illustrates a sectional view of the apparatus assembled with twin motor drive, mounted on I beam supports, although it may be assembled with a single motor or belt drive without changing the points covered by the claim hereinafter set forth. (Fig. 2) is an end elevation illustrating the cutter head, showing location of saw blade and independent teeth for loosening and cutting material.

In said drawing A—A indicate motors; B indicates the cap of the transmission case which is also used for supporting the motors; C indicates the lower section of the transmission case which is also used for the main support or base; D indicates the ball thrust bearing; E indicates the stationary suction or vacuum pipe through which the material is conveyed; F indicates the revolving sleeve in which pins or teeth are inserted on the outside; G indicates the flange for the cutter head; H indicates the cutter head; I—I indicate bronze bearings provided with ports for air feed; J—J indicate space between the revolving sleeve and the stationary pipe line used for an air port; K indicates the main entrance for air and material.

To operate my invention, attach it to a traveling crane or derrick and lower it into a pile of material (full depth if desired) with sleeve F and cutter head H revolving. While lowering, the cutter head H will cut and loosen the material which will then automatically feed into stationary pipe E (having partial vacuum) through the main entrance K.

After it has been lowered to the depth desired, it may be moved sideways in any direction. The teeth of the sleeve F of the agitator revolving rapidly will cut and loosen the material which will fall to the bottom by force of gravity and automatically enter stationary pipe E (having a partial vacuum) through main entrance K.

I am aware that prior to my discovery, agitators have been made without the combination of a cutting and feeding device. I therefore, do not claim the agitator broadly. But having fully illustrated and explained the nature of my invention and described a way to assemble and operate same though without attempting to set forth all the modes of its use.

What I claim is:

The combination of pneumatic suction agitator, cutter and feeder, consisting of stationary pneumatic conveying tube "E"; of a revolving sleeve "F", having teeth inserted in its walls, and supported at each end by bearing rings "I", provided with ports for supplying air to inner suction tube "E"; of a circular base "C", with cover "B" supporting motors "AA", and forming a combined gear case and air chamber, with thrust bearing "D"; of a cutter head "H", having cutting teeth, and a saw blade for loosening, cutting, and feeding, hog fuel or waste, from wood working machinery into pneumatic suction tube "E", substantially as described.

FRED A. DALEY.

Witnesses:
R. C. MISH,
H. E. COWGILL.